Figure 1:
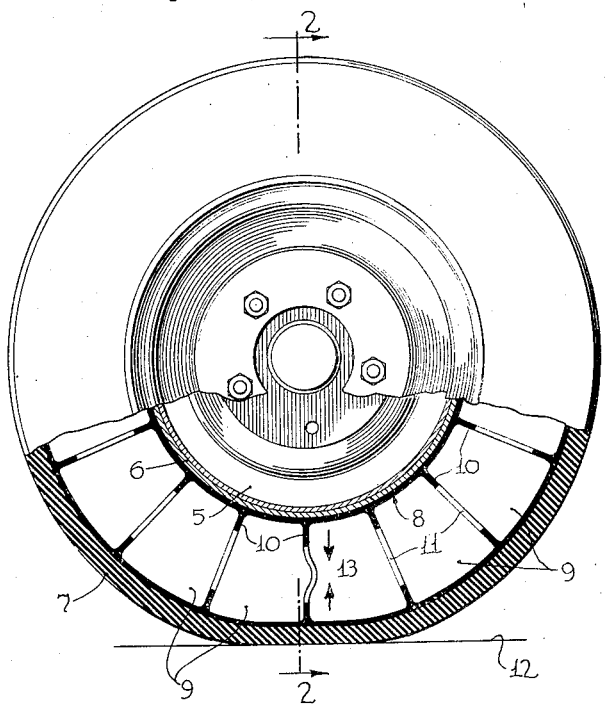

Jan. 3, 1950 — M. WATTER — 2,493,731

PNEUMATIC TIRE

Filed Sept. 10, 1946

INVENTOR
Michael Watter
BY
ATTORNEY

Patented Jan. 3, 1950

2,493,731

UNITED STATES PATENT OFFICE 2,493,731

PNEUMATIC TIRE

Michael Watter, Philadelphia, Pa.

Application September 10, 1946, Serial No. 695,983

1 Claim. (Cl. 152—333)

The invention relates to a pneumatic tire for vehicles, especially automobiles, and more particularly to the inner tube of such tires, although the invention is applicable also to structures having a combined inner tube and tire casing.

The main object of the invention is a pneumatic vehicle tire which not only cushions shocks in the sense that ordinary tires do, but which, in addition, snubs or absorbs the rebound of such shocks, that is, dampens vibrations initiated by the shocks, in a similar manner to that of shock absorbers in regard to the vibrations or oscillations set up in the vehicle springs.

The aforesaid object of the invention is achieved mainly by a vehicle tire having its space for the gaseous pressure medium subdivided into a multitude of chambers interconnected by passages, which latter are provided with means ordinarily throttling the passage of the pressure medium from one chamber to the other but opening up and permitting free communication between adjacent chambers when the tire by its contact with the ground is compressed and thereby deformed in the direction toward the center of the wheel.

More specifically, the invention contemplates the subdivision of the annular hollow space of the tire into a multitude of chambers by radial walls or diaphragms which are provided with at least one radial slit in the mid-portion, such slit constituting a very restricted passage for the air or the like where the tire has its normal shape but opening up into a wide passage when in the region of ground contact the tire is compressed and the partition wall deformed in radial direction.

The objects, advantages and features of the invention will be more easily understood from an inspection of the attached drowing illustrating diagrammatically an embodiment of the invention and from the following description of such embodiment.

Figure 2:
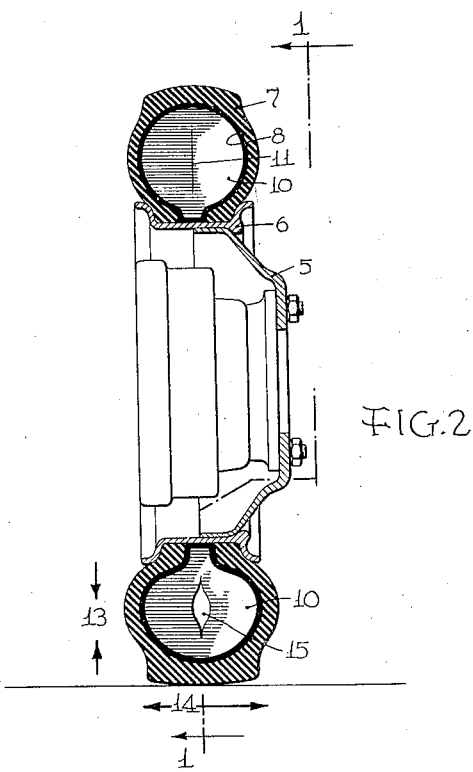

In the drawing:

Figure 1 is a side elevation of a vehicle wall with a pneumatic tire partly in section along line 1—1 of Figure 2; and Figure 2 is a transverse section along line 2—2 of Figure 1 illustrating, at the top, the normal shape of the tire and, in the region of ground contact, the deformation of the tire and of one of the partition walls with its opened radial slit.

Wheel 5 has a rim 6, which latter holds the outer casing 7 surrounding the inner tube 8, the latter being provided with a customary inflating valve (not shown).

The tube 8 is subdivided into a multitude of smaller chambers 9 by radial partition walls 10 having their circumference integrally connected to the inner surface of the tube. These diaphragms are designed and built in such a way that for the range of inflation normally used in the tire they are extended, that is, under tension. Each of the partition walls has a properly proportioned radial hole or slit 11 which, in the normally inflated form of the tire, is substantially closed and effectively throttles, that is, slows down, the passage of air or the like from one chamber 9 to another. This condition of the slit is illustrated in the upper part of Figure 2 and applies to all the partition walls 10 which are remote from the region of contact between the tire and the road surface 12.

In the region of contact between the tire and the road surface 12, the tire is radially compressed and deformed in the direction of the arrow 13, as shown in the lower part of Figure 2, while the diameter of the tire is simultaneously widened in the direction of the arrows 14, thereby laterally stretching the respective partition walls 10 in this region and widening the slit 11 into a relatively wide opening 15. Obviously, the wide opening 15 permits nearly non-restricted passage of the air between adjoining chambers 9 so that shocks due to road irregularities are cushioned as effectively as is the case with ordinary tires.

When the wheel leaves the road irregularity, it will not bounce back in the same abrupt manner as is the case with ordinary tires because the air partly expelled from the chambers adjacent the road irregularity cannot freely rush back to such chambers, but such return movement is throttled by the slits 11 as soon as the respective partition walls regain their normal form, as shown in the top portion of Figure 2. Essentially, the hole or slot in its normal shape acts like the metering pin of an oleo shock absorber.

Though the provision of the partition walls in the tire and of the throttling opening will, to a certain degree, slow down the escape of the air from the tire as a whole in case of a blow-out, the invention should not be confused with tires having partition walls provided with openings which are normally wide open but will be closed nearly completely in case of a blow-out. It will be understood from the foregoing explanation that a tire which normally permits free interchange between adjoining chambers would not answer the purpose of the invention, that is, the purpose of snubbing the rebound of the tire. It is this lastnamed new effect which forms the object of and is achieved by the invention, and which will contribute substantially to the riding comfort and will eliminate one of the remaining points in ordinary vehicle suspensions where unchecked rebounding still occurs and unchecked vibratory movements originate.

The invention is, of course, subject to many possible modifications and to adaptations to special purposes and forms of tires. For instance, the number of chambers and division walls may be changed as well as the specific arrangement and form of the partition walls. Moreover, it is obvious to those skilled in the art that the simple and effective expedient of the slit constituting the throttling opening which widens under the impact of a road obstacle could be substituted by other valve devices, such as for instance, a lift covering the hole, which control the passage between adjoining subchambers in the same or in a comparable manner.

What is claimed is:

In a tube for pneumatic vehicle tires, a multitude of circumferentially distributed and spaced radial partition walls each provided in its mid-region with at least one radially extending slit which normally presents a throttling passage for the inflating medium between adjoining chambers but enlarges into a wide opening upon deformation of the tube under radially directed outside pressure.

MICHAEL WATTER.

REFERENCES CITED

The following references are of record in the file of this patent:

UNITED STATES PATENTS

| Number | Name | Date |
|---|---|---|
| 487,419 | Lee | Dec. 6, 1892 |
| 2,064,695 | Sipe | Dec. 15, 1936 |

FOREIGN PATENTS

| Number | Country | Date |
|---|---|---|
| 632,251 | France | Oct. 1, 1927 |
| 695,994 | France | Oct. 7, 1930 |